United States Patent
Tomandl (10) Patent No.: US 10,675,997 B2
(45) Date of Patent: Jun. 9, 2020

(54) METHOD OF ASSEMBLING A RELEASE MECHANISM

(71) Applicant: Grand Rapids Controls Company, LLC, Rockford, MI (US)

(72) Inventor: Mark G. Tomandl, Coral, MI (US)

(73) Assignee: CTC Acquisition Company LLC, Rockford, MI (US)

( * ) Notice: Subject to any disclaimer, the term of this patent is extended or adjusted under 35 U.S.C. 154(b) by 276 days.

(21) Appl. No.: 15/226,663

(22) Filed: Aug. 2, 2016

(65) Prior Publication Data

US 2016/0339811 A1 Nov. 24, 2016
US 2018/0229630 A9 Aug. 16, 2018

Related U.S. Application Data

(60) Division of application No. 14/183,038, filed on Feb. 18, 2014, now abandoned, which is a continuation-in-part of application No. 13/315,797, filed on Dec. 9, 2011, now abandoned.

(51) Int. Cl.
| | |
|---|---|
| *B60N 2/235* | (2006.01) |
| *F16C 1/12* | (2006.01) |
| *B60N 2/02* | (2006.01) |
| *B60N 2/90* | (2018.01) |

(52) U.S. Cl.
CPC ......... *B60N 2/2356* (2013.01); *B60N 2/0296* (2013.01); *B60N 2/933* (2018.02); *F16C 1/12* (2013.01); *Y10T 74/20438* (2015.01)

(58) Field of Classification Search
CPC ............... B60N 2/6671; B60N 2/2356; B60N 2205/40; Y10T 74/19679
See application file for complete search history.

(56) References Cited

U.S. PATENT DOCUMENTS

| | | |
|---|---|---|
| 3,958,828 A | 5/1976 | Ishida et al. |
| 4,384,744 A | 5/1983 | Barley |
| 4,765,681 A | 8/1988 | Houghtaling et al. |
| 4,900,088 A | 2/1990 | Bechtle et al. |
| 5,681,005 A | 10/1997 | Ligon, Sr. et al. |
| 5,842,659 A | 12/1998 | Ligon, Sr. et al. |
| 6,006,627 A | 12/1999 | Ikeda et al. |
| 6,637,575 B2 | 10/2003 | Liu et al. |
| 6,688,443 B2 | 2/2004 | Liu |

(Continued)

FOREIGN PATENT DOCUMENTS

| | | |
|---|---|---|
| DE | 69622201 T2 | 2/2003 |
| DE | 60213437 T2 | 1/2007 |

(Continued)

OTHER PUBLICATIONS

Definition of Friction by Merriam-Webster, merriam-webster.com., Dec. 8, 2018 (Year: 2018).*

(Continued)

*Primary Examiner* — Vinh Luong
(74) *Attorney, Agent, or Firm* — Price Heneveld LLP (57) ABSTRACT

A release mechanism generates a force on a cable to operate an adjustment mechanism or the like in a seat or other device. The release mechanism includes a rotor, a housing, a spring, and a cover that attaches to the housing. The spring generates a torque, and the spring also axially biases the rotor into engagement with the cover to prevent rattling.

15 Claims, 8 Drawing Sheets

(56) References Cited

U.S. PATENT DOCUMENTS

| | | | |
|---|---|---|---|
| 6,691,851 B2 | 2/2004 | Liu et al. | |
| 6,860,374 B2 | 3/2005 | Liu et al. | |
| 6,945,600 B2 | 9/2005 | Liu | |
| 6,997,847 B2 * | 2/2006 | Liu | B60N 2/929 |
| | | | 475/317 |
| 7,395,733 B2 | 7/2008 | Liu | |
| 7,530,638 B2 | 5/2009 | Day et al. | |
| 7,556,315 B2 | 7/2009 | Nathan et al. | |
| 7,694,930 B2 | 4/2010 | Ritter et al. | |
| 7,938,039 B2 | 5/2011 | Cox | |
| 8,011,269 B2 | 9/2011 | Elliot et al. | |
| 8,162,404 B2 | 4/2012 | Ueda | |
| 9,889,774 B2 * | 2/2018 | Espinosa | B60N 2/2227 |
| 2003/0061899 A1 | 4/2003 | Liu et al. | |
| 2003/0062749 A1 | 4/2003 | Liu et al. | |
| 2003/0085099 A1 | 5/2003 | Liu | |
| 2003/0196868 A1 | 10/2003 | Liu et al. | |
| 2004/0154890 A1 | 8/2004 | Liu | |
| 2006/0163924 A1 | 7/2006 | Liu | |
| 2007/0232129 A1 | 10/2007 | Cox | |
| 2007/0235271 A1 | 10/2007 | Elliot et al. | |
| 2008/0148889 A1 | 6/2008 | Elliot et al. | |
| 2008/0276748 A1 | 11/2008 | Chen | |
| 2009/0026825 A1 | 1/2009 | Ishijima et al. | |
| 2010/0109406 A1 | 5/2010 | Ueda | |
| 2010/0162844 A1 * | 7/2010 | Akutsu | B60N 2/444 |
| | | | 74/479.01 |
| 2011/0097683 A1 * | 4/2011 | Boyd | A61C 1/0084 |
| | | | 433/77 |
| 2014/0132053 A1 * | 5/2014 | Schuler | B60N 2/236 |
| | | | 297/367 P |
| 2014/0144278 A1 * | 5/2014 | Tomandl | B60N 2/0296 |
| | | | 74/502.2 |
| 2016/0339809 A1 * | 11/2016 | Wetzig | B60N 2/20 |

FOREIGN PATENT DOCUMENTS

| | | | |
|---|---|---|---|
| DE | 102007016587 A1 | 11/2007 | |
| DE | 102012010402 B3 * | 10/2013 | B60N 2/2356 |
| EP | 1939932 A1 | 8/2000 | |
| EP | 1939032 A1 | 7/2008 | |
| JP | 2005119368 A | 5/2005 | |
| JP | 2007196902 A | 8/2007 | |
| KR | 100321587 B1 | 6/2002 | |
| KR | 1020080090540 A | 10/2008 | |
| WO | WO 2008024851 A2 * | 2/2008 | |

OTHER PUBLICATIONS

Define friction—Google Search, google.com., Dec. 5, 2018 (Year: 2018).*
Friction—Wikipedia, wikipedia.org., Dec. 5, 2018 (Year: 2018).*
Google Translation of German Patent Office Action, dated Jun. 25, 2018. (Year: 2018).*
Define surface—Google Search, Nov. 9, 2019 (Year: 2019).*
International Search Report, PCT/US2012/067761, dated Feb. 21, 2013, 3 Pages.
Harold A. Rothbart, Mechanical Design and Systems Handbook, 1964.
Torsion Spring, Wikipedia, http://en.wikipedia.org/wiki/Torsion_spring, Oct. 8, 2013, 6 pages.

* cited by examiner

METHOD OF ASSEMBLING A RELEASE MECHANISM

CROSS-REFERENCE TO RELATED APPLICATIONS

This application is a divisional of U.S. patent application Ser. No. 14/183,038, filed Feb. 18, 2014, now abandoned, entitled "RELEASE MECHANISM." This application is also a Continuation-In-Part of U.S. patent application Ser. No. 13/315,797, filed Dec. 9, 2011, and entitled "RELEASE MECHANISM," now abandoned, the entire disclosures of each of which are incorporated herein by reference.

BACKGROUND OF THE INVENTION

Seats for motor vehicles and the like may include one or more adjustment features such as a seat back tilt mechanism that selectively retains the seat back in a position selected by a user. The seat may include additional adjustment features such as fore-aft sliding of the seat relative to the vehicle floor, and other such adjustment features. Various types of mechanisms have been developed to retain the seat components in a desired position. Such mechanisms may be actuated by a cable that is connected to a manually-operated release mechanism by an elongated cable. Also, elongated cables may be utilized to operably interconnect a lever or other release member located inside a vehicle to a component such as a hood release latch. Various mechanisms for manual user input have been developed. However, known mechanisms may suffer from various drawbacks.

BRIEF SUMMARY OF THE INVENTION

One aspect of the present invention is a release mechanism of the type utilized to shift an elongated connector to selectively release an adjustment mechanism. The release mechanism includes a housing defining a pivot element, and a rotor disposed within the housing and pivotably engaging the pivot element for rotation about an axis. The rotor is adapted to be manually rotated by a user, and the rotor includes a connecting feature that provides for connecting an end of an elongated flexible cable to the rotor, such that rotation of the rotor shifts the elongated flexible cable. The release mechanism also includes a helical coil spring having a first end connected to the housing, and a second end connected to the rotor. The coil spring is rotationally deformed to rotationally bias the rotor for rotation in a first direction about the axis, and the coil spring is also compressed, and biases the rotor axially away from the housing along the axis.

The housing may include a separate cover that snaps onto a main portion of the housing during assembly. The housing and rotor can be utilized in either a "left hand" or "right hand" orientation. The housing and rotor may be symmetrical about a center plane, and the direction of the rotational bias of the rotor can be changed by selecting a helical coil that generates either a clockwise or counter clockwise torque on the rotor. Also, the housing may include connecting features whereby a cable can be interconnected to the housing of the release mechanism at either of two opposite side faces of the housing.

The release mechanism may include a rotation-limiting feature such as a boss on the rotor and corresponding arcuate slot on the housing to limit rotation of the rotor relative to the housing. During assembly, the rotor is rotated against the spring bias relative to the main portion of the housing, and the rotor is shifted axially to move the boss into the arcuate slot. Friction between the boss and a side surface of the arcuate slot prevents shifting of the rotor that could otherwise occur due to the axial bias of the helical coil spring.

These and other features, advantages, and objects of the present invention will be further understood and appreciated by those skilled in the art by reference to the following specification, claims, and appended drawings.

DETAILED DESCRIPTION OF EMBODIMENTS

Figure 1:
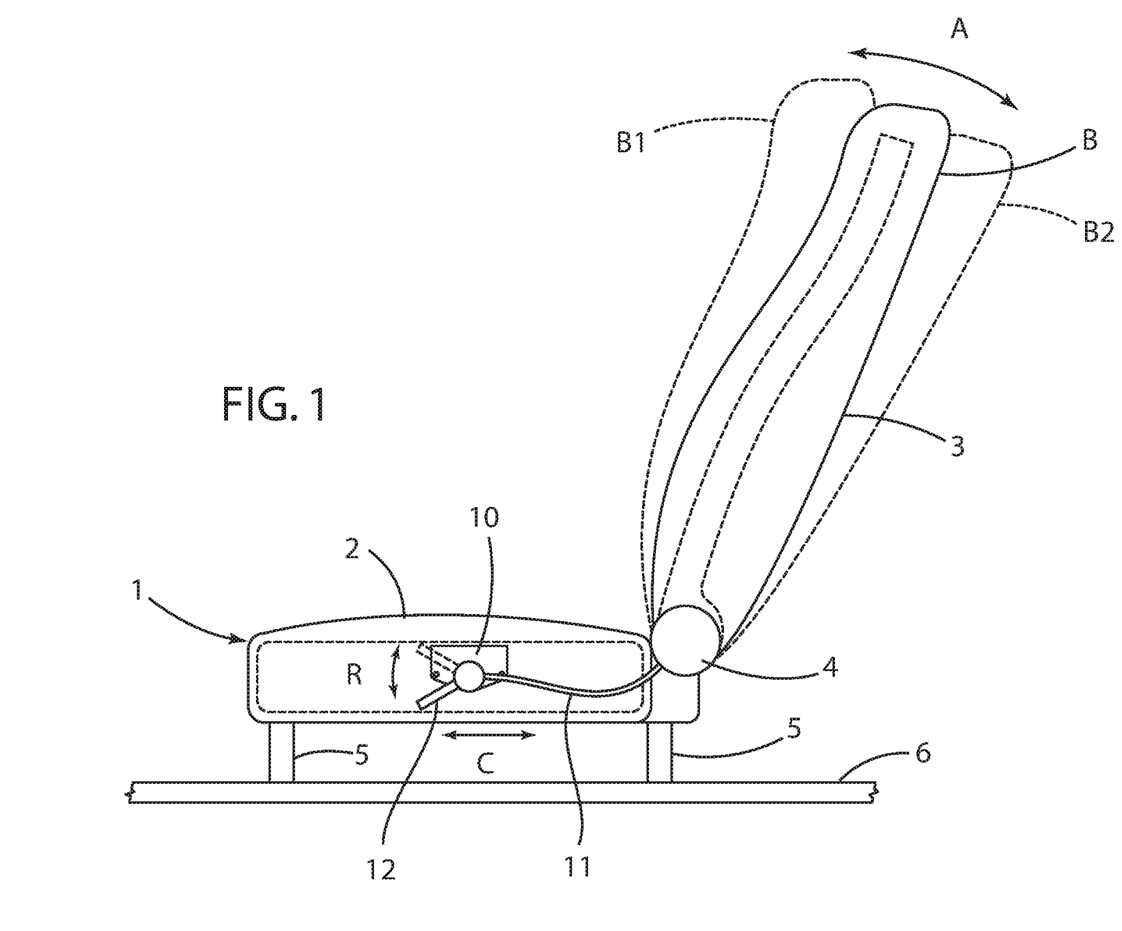
FIG. 1 is a partially fragmentary side elevational view of a motor vehicle seat or the like including an adjustment mechanism and a release mechanism that is interconnected to the adjustment mechanism by an elongated cable.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a seat assembly 1 includes a seat portion 2 and a back portion 3 that is pivotally interconnected to the seat portion for fore-aft tilting movement as indicated by the arrow "A." A releasable adjustment mechanism 4 selectively retains the back portion 3 at various positions B, B1, B2 etc. An adjustment mechanism 4 may be positioned on both the left and right sides of the seat 1. A support structure 5 interconnects the seat assembly 1 with a vehicle floor 6. The support structure 5 may include slides or the like (not shown) that permit movement of the seat assembly 1 in a fore-aft direction relative to the floor 6 of a vehicle as indicated by the arrow "C." The seat portion 2, back portion 3, adjustment mechanism 4, and support structure 5 may comprise conventional, known components such that these parts will not be described in detail herein A release mechanism 10 is operably interconnected to the adjustment mechanism 4 by an elongated cable 11. The release mechanism 10 includes a movable input member such as a handle 12 that is movable as indicated by the arrow "R" by a user to selectively release adjustment mechanism 4 to permit tilting of the seat back 3.

Figure 4:
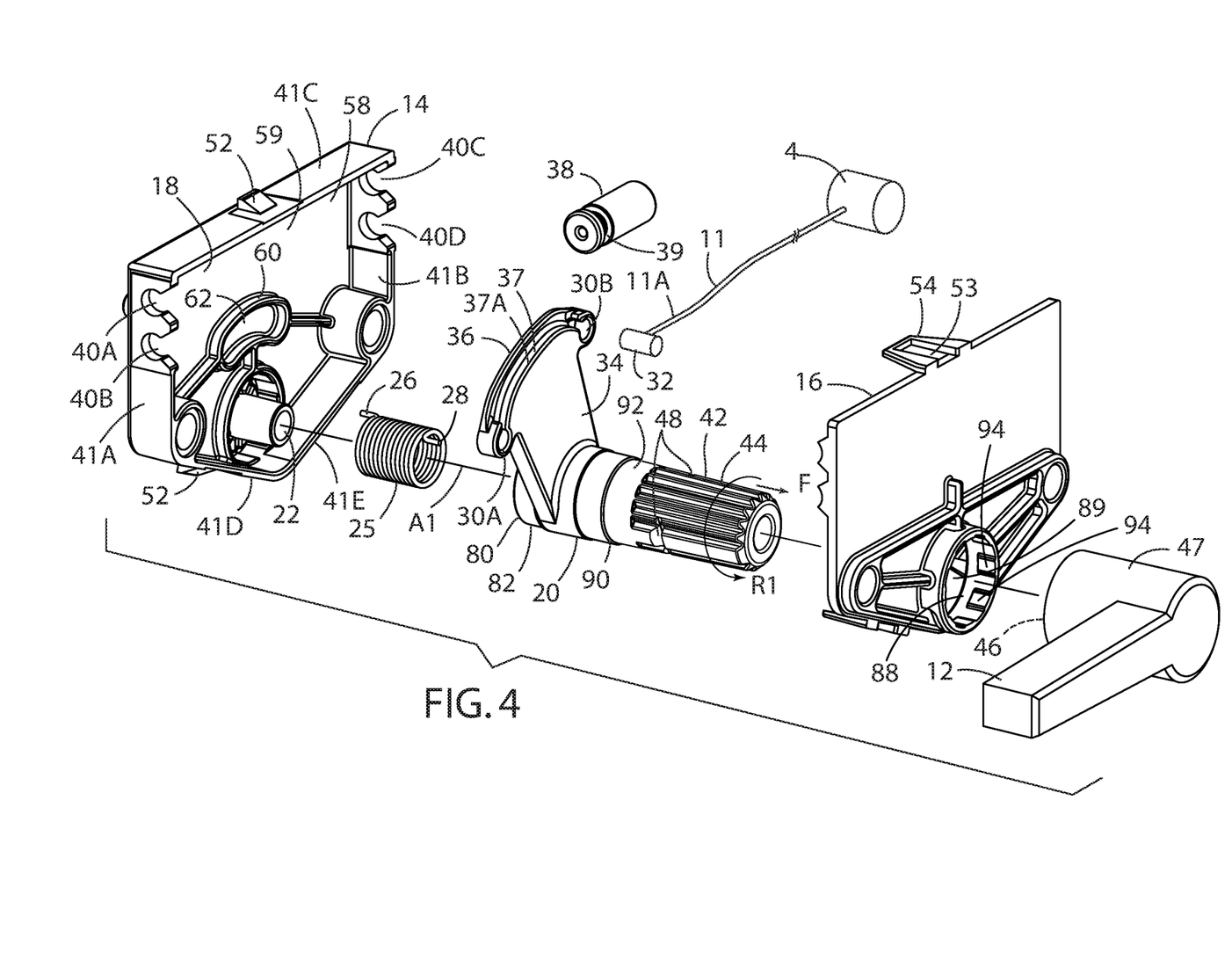
FIG. 4 is an exploded isometric view of the release mechanism of FIG. 2.

With further reference to FIGS. 2-4 and 4A, mechanism 10 includes a housing having a first portion 14 and a second portion (component) or cover 16 that together form an interior space 18. When assembled, a rotor 20 is rotatably interconnected with a boss or protrusion 22 of housing 14 for rotation about an axis "A1" (FIG. 4). As discussed in more detail below, a spring 25 includes a first end 26 that is interconnected to housing 14, and a second end 28 that is interconnected with rotor 20 to rotationally bias the rotor 20 relative to housing 14 for rotation about an axis "A1." Rotor 20 includes an arm 34 having an end portion 36 that includes first and second connecting features 30A and 30B (cavities) that interconnect with a fitting 32 of cable 11 whereby rotation of rotor 20 longitudinally shifts the cable 11 and releases adjustment mechanism 4. The arm 34 is substantially symmetrical such that either connecting feature 30A or connecting feature 30B can be utilized to connect with a cable end fitting 32. In the illustrated example, the end fitting 32 is received in connector 30A to thereby pull on cable 11 upon rotation of rotor 20 in the direction of the arrow "R1." An end portion 11A of cable 11 wraps around curved end surface 37 of arm 34. End surface 37 may include a relatively flat central portion 37A having a reduced radius about axis A1 to provide increased force on cable 11 as it wraps around central portion 37A. Cable end fitting 32 may be received in connecting feature 30B such that rotation of rotor 20 in a direction opposite the arrow "R1" pulls on cable 11 to actuate adjustment mechanism 4. The direction of rotational bias provided by spring 25 may be reversed if connecting feature 30B is utilized to thereby provide the proper rotational bias for a particular application. A bushing or fitting 38 includes an annular groove 39 that engages a selected one of the openings 40A-40D of sidewall 41A or 41B of housing 14 to slidably support cable 11 where it enters housing 14.

Rotor 20 includes a generally cylindrical extension 42 having a plurality of teeth or splines 44 that engage corresponding teeth or splines 46 on an interior portion of extension 47 of handle 12 in a known manner to interconnect rotor 20 and handle 12. A pair of transverse slots 48 receive a clip or other retainer (not shown) to retain handle 12 to rotor 20 in a conventional manner.

The first portion 14 includes a plurality of wedges 52 that protrude from sidewalls 41C, 41D, and 41E. Wedges 52 are received in openings 53 formed in transverse flaps or extensions 54 (see also FIGS. 2 and 3). The wedges 52 and corresponding connectors 53-54 retain cover 16 on the first portion 14 prior to installation of the release mechanism 10 on a seat assembly 1. Threaded fasteners 56 (FIG. 3) are received in openings 57 in the first portion 14 and cover 16 (FIGS. 2 and 3) and engage threaded openings in the seat structure to secure the release mechanism 10 to the seat assembly 1. Fasteners 56 also ensure that the first portion 14 and cover 16 remain assembled together when mechanism 10 is attached to the seat assembly 1.

Figures 2, 3:
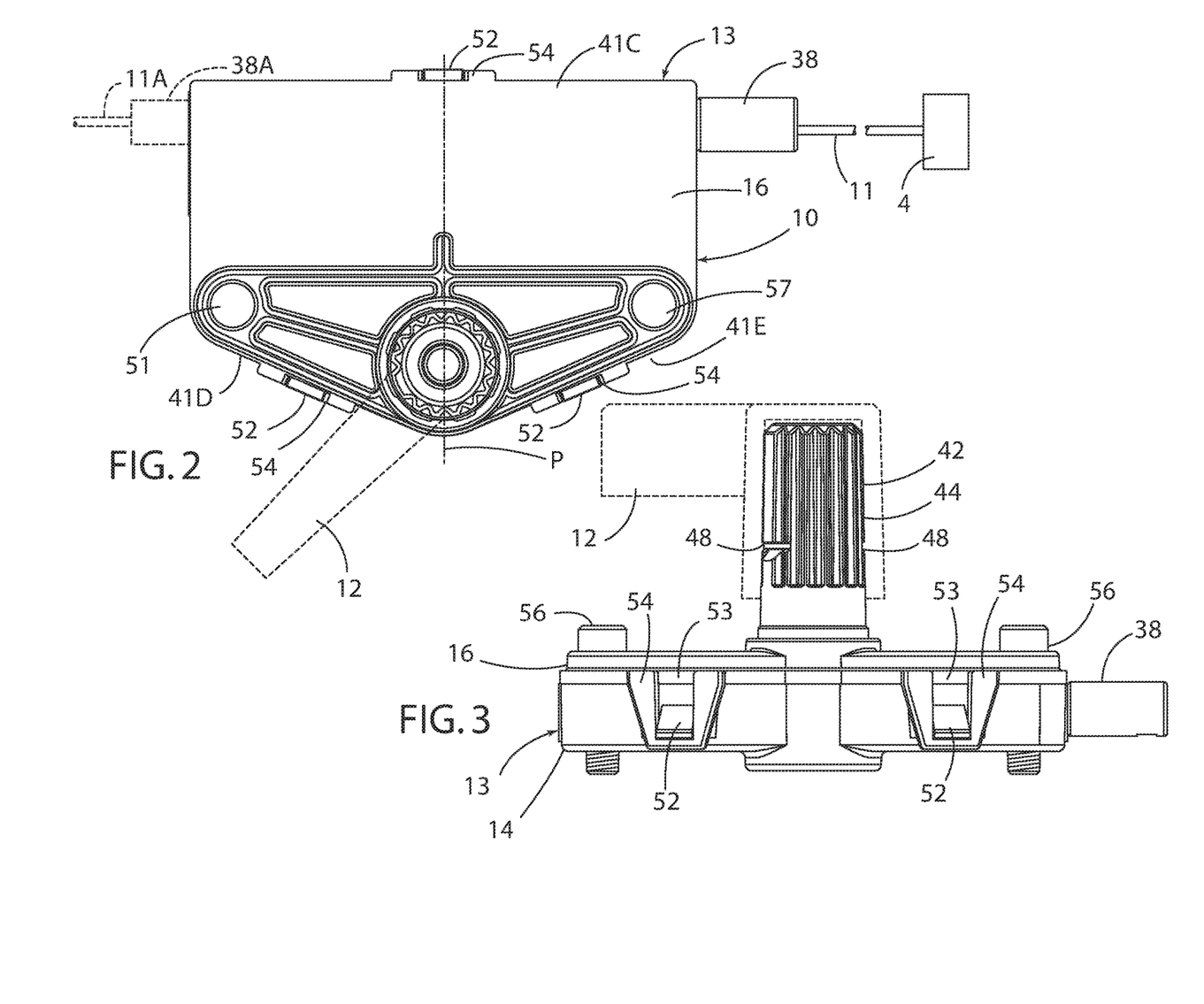
FIG. 2 is a top plan view of a release mechanism according to one aspect of the present invention.
FIG. 3 is a front elevational view of the release mechanism of FIG. 2.
Figure 5:
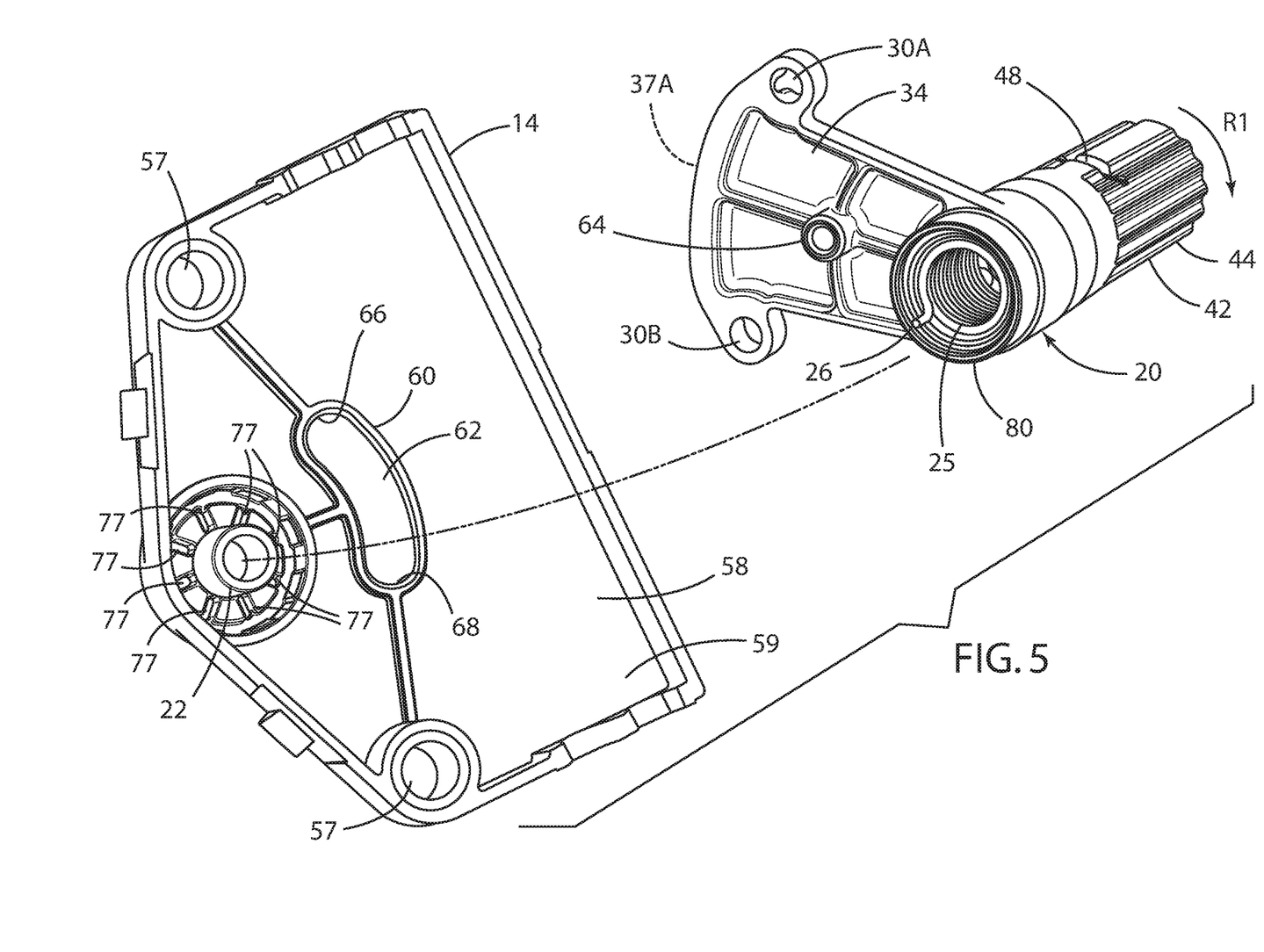
FIG. 5 is a partially exploded isometric view of the release mechanism of FIG. 2.

With further reference to FIG. 5, arm 34 of rotor 20 includes cylindrical extension 64. The first portion 14 includes a ridge or sidewall 60 that protrudes from inner surface 58 of sidewall 59 of the first portion 14. When assembled, extension 64 is received in arcuate slot 62, and spring 25 rotatably biases extension 64 towards end surface 66 or end surface 68 of arcuate slot 62. Spring 25 may be configured to rotatably bias rotor 20 in a first direction R1, or a second direction that is opposite R1, depending upon which direction handle 12 is required to rotate when release mechanism 10 is installed on a seat or other structure. For example, in FIG. 1 mechanism 10 is mounted on a left side of a seat 2, and handle 12 rotates upwardly when the handle 12 is pulled by a user. However, mechanism 10 may also be installed on a seat at a lower right side edge whereby the mechanism 10 is rotated 180 degrees about a horizontal axis relative to the orientation shown in FIG. 1. If mechanism 10 is configured for use on a right side edge of a seat, the spring 25 is configured to provide a bias in the opposite rotational direction, and cable 11 will be configured to extend out of an opposite sidewall of the first portion 14. Because the mechanism 10 is substantially symmetrical (other than spring 25) about a center plane "P" (FIG. 2) Cable 11 is oriented in either the configuration shown in FIG. 2 in solid lines, or in the configuration shown in dashed lines 11A as also shown in FIG. 2.

Figure 6:
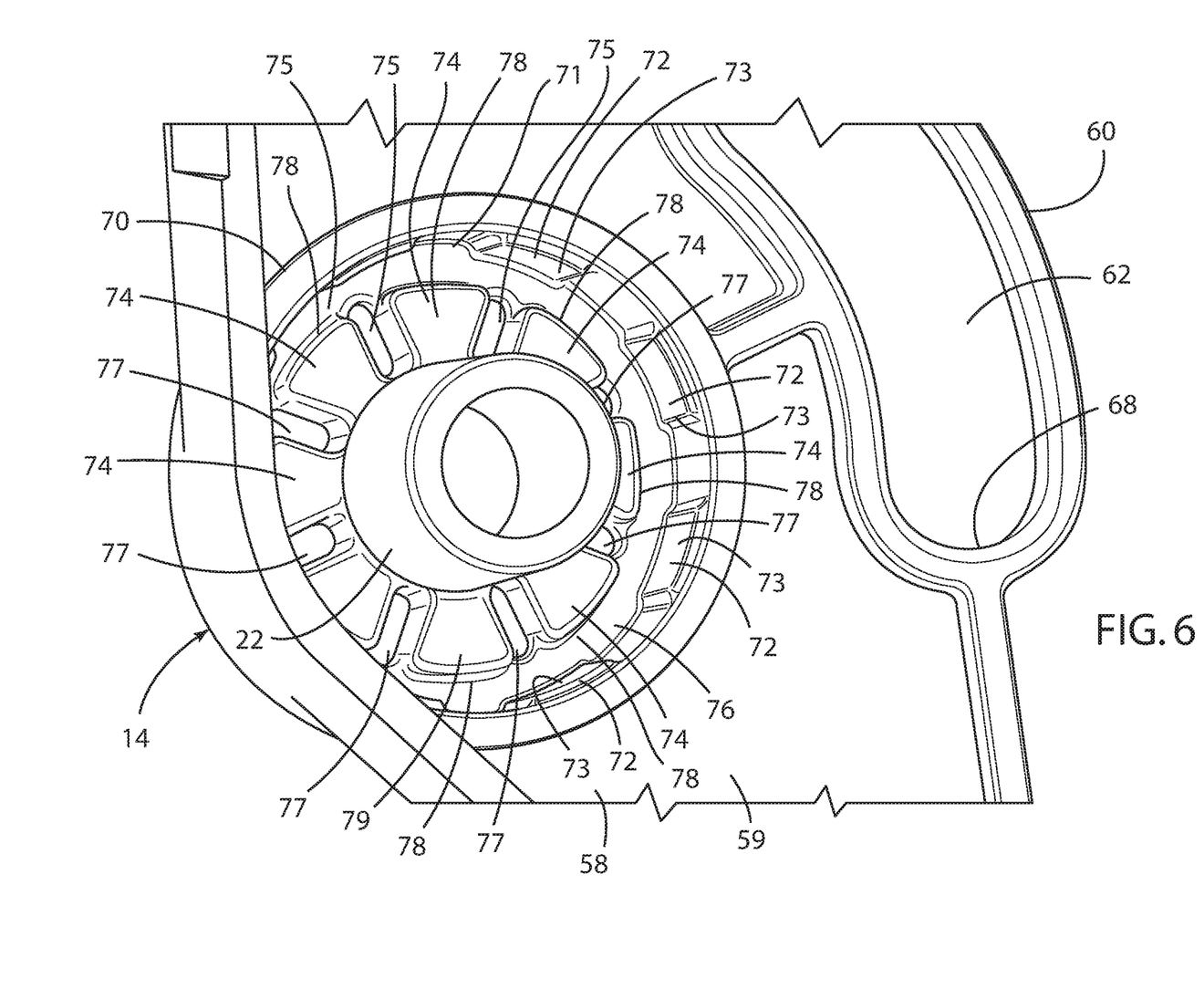
FIG. 6 is a partially fragmentary enlarged, isometric view of a portion of a release mechanism according to one aspect of the present invention.

With further reference to FIG. 6, the first portion 14 includes an annular wall 70 protruding from inner side surface 58 of sidewall 59 of the first portion 14. An inner side of sidewall 70 includes a plurality of raised portions or pads 72 having cylindrical end surface portions 73. A ring-like annular space 76 is formed between boss 22 and cylindrical sidewall 70. A plurality of protrusions 74 project into annular space 76 from sidewall 59. A plurality of grooves 77 are formed between protrusions 74. Grooves 77 extend radially away from boss 22. When assembled, end 26 (see also FIG. 5) of spring 25 is received in a selected one of the grooves 77 to thereby rotationally retain the spring 25 relative to the first portion 14.

Figure 7:
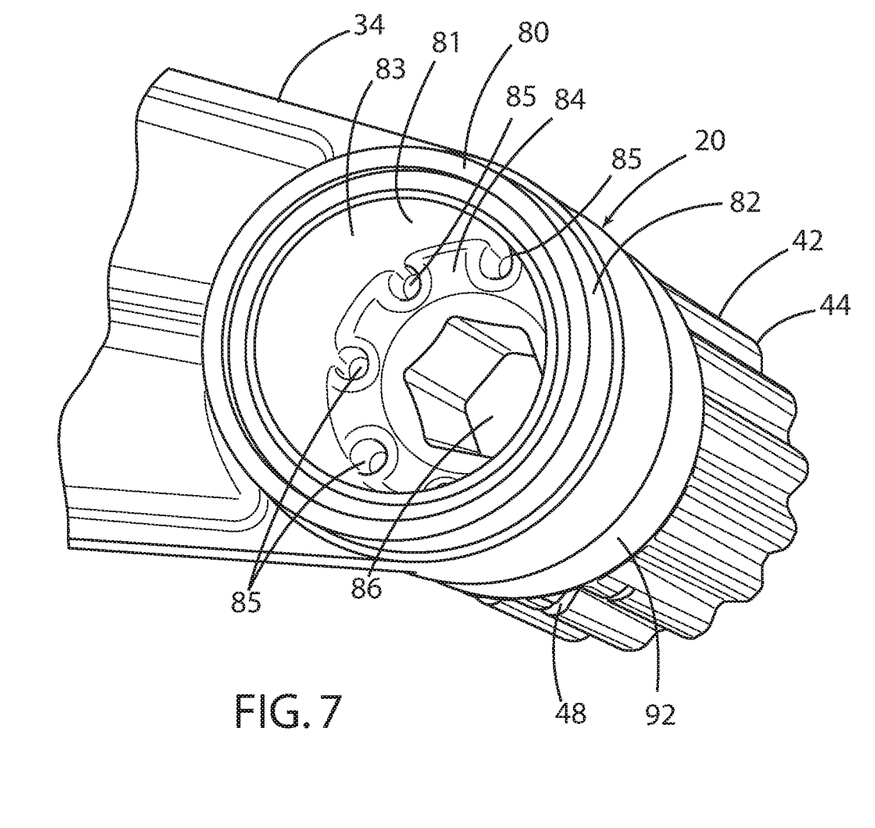
FIG. 7 is a partially fragmentary, enlarged isometric view of a portion of a rotor of a release mechanism according to one aspect of the present invention.

The protrusions 74 also define convex cylindrical outer surfaces 78 that face the concave cylindrical surfaces 73 of pads 72 of cylindrical sidewall 70. When assembled, the space between surfaces 73 and 78 receives end portion 80 (FIG. 7) of rotor 20. End portion 80 of rotor 20 includes a cylindrical inner side surface 81 that defines a cylindrical cavity or space 83. End portion 80 also includes a cylindrical outer surface 82. When mechanism 10 is assembled, end 28 (see also FIG. 4) of spring 25 is received in a selected one of a plurality of openings 85 in inner base surface 84 of cavity 83. An opening 86 in rotor 20 has a hexagonal shape to receive a hexagonal tool (not shown) during assembly of rotor 20 and housing 14 to control the rotational position of rotor 20 relative to housing 14.

Figure 4A:
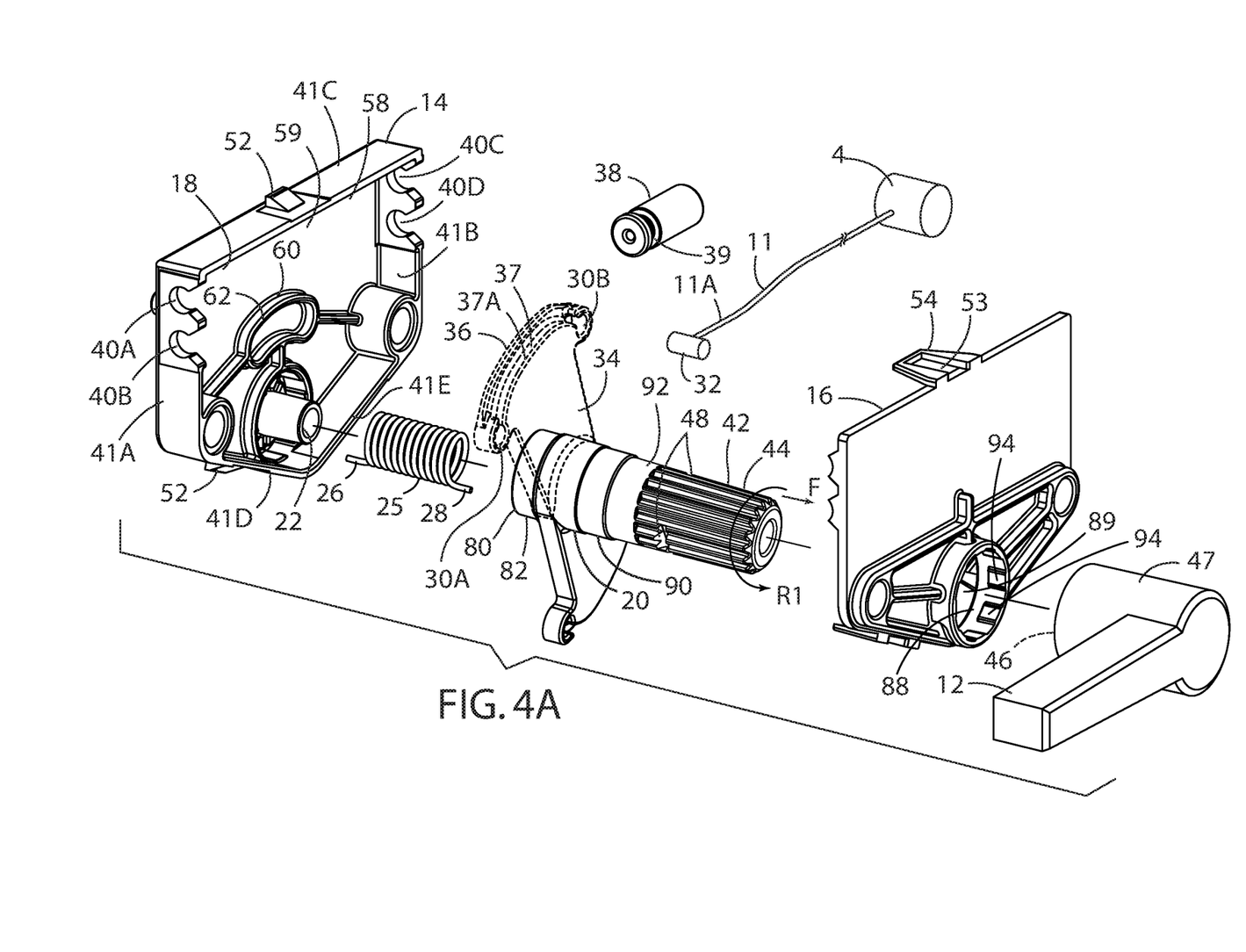
FIG. 4A is an exploded isometric view of the release mechanism of FIG. 2 showing the spring in an uncompressed state.
Figure 8:
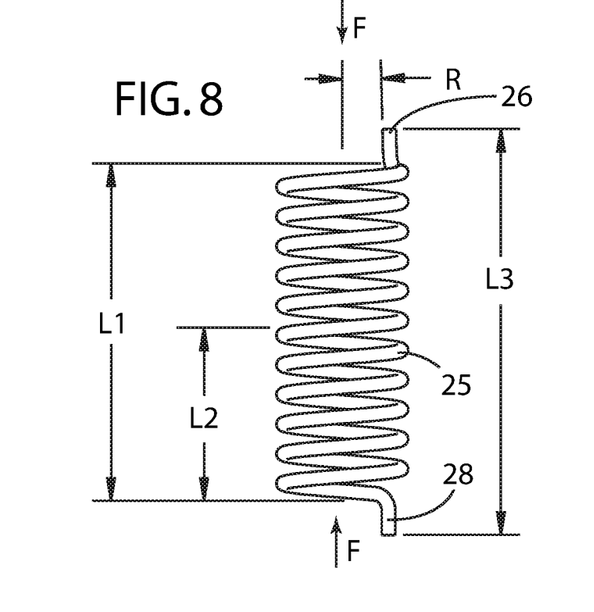
FIG. 8 shows a coil spring according to one aspect of the present invention in an uncompressed state.
Figure 9:
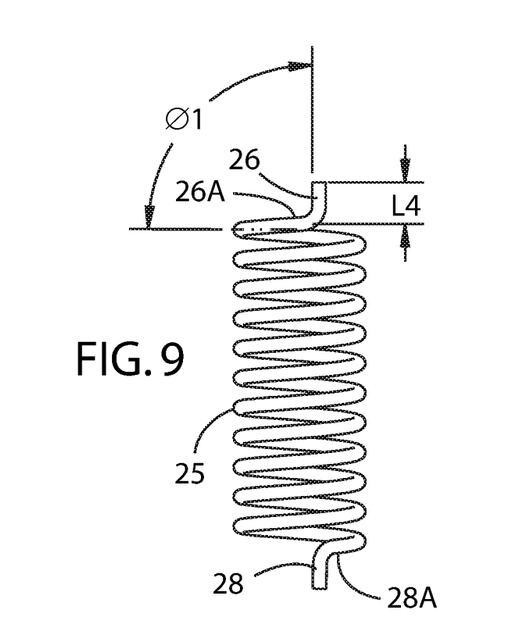
FIG. 9 shows the spring of FIG. 8.
Figure 10:
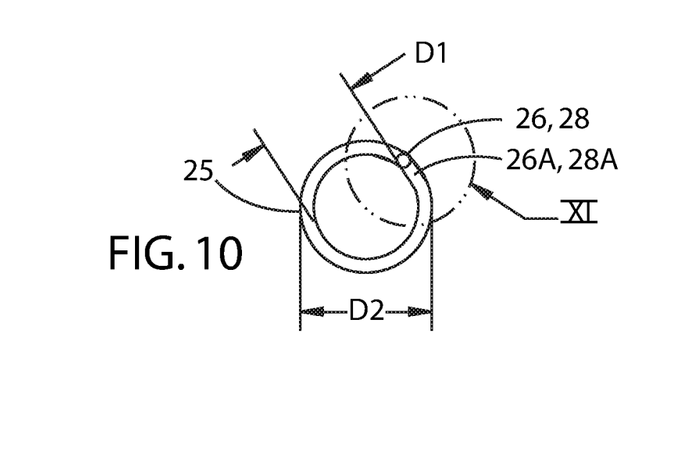
FIG. 10 is an end view of the spring of FIG. 8.

During assembly, end 26 of spring 25 (FIGS. 4 and 4A) is positioned in a selected slot 77 (FIG. 6) of the first portion 14, with a portion of spring 25 being disposed between cylindrical sidewall 70 and boss 22 of the first portion 14. Spring 25 is initially in an uncompressed or "free" state wherein the individual coils of spring 25 are spaced apart as shown in FIGS. 4A, 8 and 9. Rotor 20 is then moved to a position adjacent the first portion 14, such that end 28 of spring 25 is received in a selected one of the openings 85 (FIG. 7) of rotor 20. Rotor 20 is then rotated relative to the first portion 14 using a hexagonal tool (not shown), such that spring 25 generates a torsional bias or force between the first portion 14 and rotor 20. Rotor 20 is then shifted axially along axis A1 (FIG. 4) to position end portion 80 of rotor 20 on the boss 22 of the first portion 14. End portion 80 of rotor 20 is received in the space 76 (FIG. 6) between surfaces 73 of pads 72 and the end surfaces 78 of protrusions 74. As the rotor 20 is moved into position relative to the first portion 14, protrusion 64 (FIG. 5) of rotor 20 is positioned in arcuate slot 62 of the first portion 14. After the extension 64 is positioned in arcuate slot 62, the torsional force acting on rotor 20 by the hexagonal tool is removed, and the torsional force caused by spring 25 causes extension 64 on arm 34 of rotor 20 to move into engagement with end 66 (or end 68) of arcuate slot 62. As rotor 20 is moved into position relative to the first portion 14, spring 25 is compressed in addition to being rotationally deformed. This causes spring 25 to generate an axial force tending to push rotor 20 away from the first portion 14. However, friction between extension 64 and end 66 (or 68) of arcuate slot 62 is sufficient to prevent the axial bias from shifting rotor 20 relative to the first portion 14. When compressed, the coils of spring 25 are in contact with one another or directly adjacent one another as shown in FIG. 4.

After the temporary subassembly of the first portion 14 and rotor 20 is formed. Bushings 38 are assembled with the first portion 14, and end fitting 32 of cable 11 is positioned in connector 30A or connector 30B of arm 34 of rotor 20. It will be understood that these operations may be performed either before rotor 20 is installed in the first portion 14, or after rotor 20 is installed in the first portion 14. Cover 16 is then snapped onto the first portion 14 and retained thereon by wedges 52 and openings 53.

Referring back to FIG. 4, After the cover 16 and housing 14 are assembled, spring 25 shifts rotor 20 towards cover 16 slightly, such that annular bearing surface 90 of extension 42 of rotor 20 slidably engages an annular bearing surface 88 formed around opening 89 of cover 16 to prevent axial shifting of the rotor 20 away from the housing 14 beyond a predefined position relative to the housing 14. The engagement of bearing surfaces 88 and 90 prevents rattling of rotor 20 when installed to a seat, yet permits some variation in the sizing of the components.

When assembled, outer surface 82 (FIG. 4) of end 80 of rotor 20 slidably engages surface 73 (FIG. 6) of the first portion 14, and outer surface 92 of extension 42 of rotor 20 slidably engages surfaces or pads 94 (FIG. 4) of opening 90 in cover 16.

During assembly, handle 12 is positioned on extension 42 of rotor 20, and a clip or other retainer (not shown) is positioned in engagement with transverse slots 48 of extension 42 to thereby retain the handle 12.

Because the rotor 20 can be temporarily assembled with the first portion 14, rotor 20 does not need to be retained in position relative to the first portion 14 by a fixture or the like while cover 16 is installed. Thus, assembly of release mechanism 10 is simplified. Also, as discussed above, the axial bias of spring 25 ensures that the bearing surface 90 of rotor 20 remains in sliding engagement with the corresponding bearing surface 88 of cover 16. The bearing surfaces 88 and 90 may comprise low friction materials, such that very little frictional resistance is generated. This permits spring 25 to have a relatively low torsional stiffness to return handle 12 to the rest position.

With further reference to FIGS. 8-11, spring 25 may comprise a helical coil spring having a wire diameter of 1.14 mm with 10 coils. The coils may have a right hand or left hand wind direction as required to provide a right or left hand version of mechanism 10. The spring 25 has a free or unstressed length "L1" of 28.5 mm. In general, the length L1 may be about 23.0 mm to about 33.0 mm. However, lengths L1 outside this range may also be utilized if required for a particular application. During assembly, an axial force "F" is applied to the spring 25 as described in more detail above. This results in a compression of spring 25 to an installed length "L2" of 14.65 mm. Thus, the deflection of spring 25 when installed is about 13.85 mm.

Figure 11:
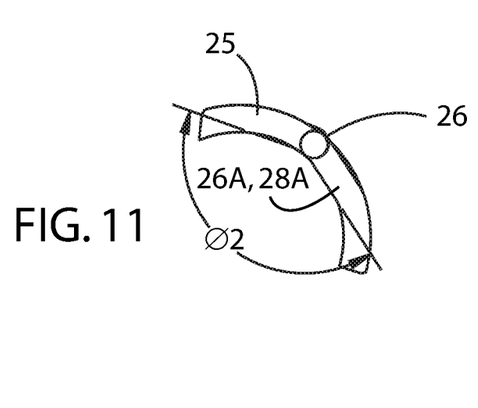
FIG. 11 is an enlarged, fragmentary view of a portion of the spring of FIG. 10.

The overall length "L3" of spring 25 in an unstressed or free state is 34.34 mm as shown in FIG. 8. The inner radius "R" is 1.40 mm, and the outer diameter "D2" (FIG. 10) is 11.15 mm. The spring 25 may include straight portions 26A and 28A directly adjacent the ends 26 and 28, respectively. The inner dimension "D1" (FIG. 10) is 8.72 mm, and the outside diameter "D2" is 11.15 mm. With reference to FIG. 11, the angle "θ2" is 142.4°. Ends 26 and 28 extend at an angle "θ1" of 90°. Spring 25 is preferably made of spring steel or other suitable material such as music wire (ASTM A228), and the spring 25 has a maximum solid height of 12.65 mm. The specific dimensions given above are an example of one possible configuration for spring 25. However, the specific dimensions, shapes, materials, and other characteristics of spring 25 may vary as required for a particular application. For example, mechanism 10 may be utilized in connection with different types of seats requiring different force characteristics to release adjustment mechanism 4 (FIG. 1) or other such mechanism. It will be understood that the specific dimensions of the mechanism and spring 25 may vary as required, and the release mechanism 10 of the present application is not limited to any specific application.

As discussed above, the installed length L2 of spring 25 is greater than the solid height or length of spring 25. Accordingly, when spring 25 is installed in mechanism 10 spring 25 is in a compressed state. When spring 25 is in the compressed (installed) state, the spacing between the individual coils of spring 25 is reduced, and spring 25 generates a biasing force tending to expand the length of spring 25. As discussed above, this biasing force insures that bearing surface 90 of rotor 20 remains in sliding engagement with corresponding bearing surface 88 of cover 16.

As also discussed above, mechanism 10 may be assembled by temporarily assembling rotor 20 with the first portion 14, with friction between extensions 64 and end 66 (or end 68) of arcuate slot 62 to generate friction sufficient to prevent axial bias of spring 25 from shifting rotor 20 relative to the first portion 14. Alternatively, mechanism 10 may also be assembled as follows. First, the first portion 14 may be positioned in a fixture (not shown) or otherwise retained in a generally horizontal orientation with interior space 18 (FIG. 4) facing upwardly. Spring 25 is then positioned over boss 22, and shifted (if required) to cause end 26 of spring 25 to engage one of the grooves 77 (FIG. 6) of the first portion 14. The rotor 20 is then positioned on spring 25 such that spring 25 is received within cylindrical cavity or space 83 of rotor 20 (FIGS. 5 and 7), and end 28 of spring 25 is engaged with one of the openings 85 (FIG. 7) of rotor 20. The arm 34 of rotor 20 is initially oriented as shown in solid lines in FIG. 4A. This initial position is rotated 180° relative to the assembled orientation of arm 34 shown in dashed lines in FIG. 4A. The assembled orientation of arm 34 is also shown in solid lines in FIG. 4. After placing the rotor 20 onto the spring 25, cover 16 is positioned on rotor 20 with extension 42 of rotor 20 extending through opening 89 of cover 16. A hex tool (not shown) is positioned in hex opening 86 (FIG. 7) of rotor 20, and the rotor 20 is then rotated 180° until it is in the assembled rotational orientation (FIG. 4). Rotor 20 may be rotationally constrained due to engagement of extension 64 on arm 34 of rotor with end 66 or 68 of arcuate slot 62. Alternatively, rotor 20 may be configured to temporarily engage cover 16 to prevent rotation of rotor 20 during the assembly process.

After the cover 16 is positioned over rotor 20 and rotor 20 is rotated to its assembled angular orientation, the first portion 14 and cover 16 are pushed together and interconnected utilizing wedges 52 and openings 53 as described in more detail above.

Due to the axial compression (deflection), spring 25 generates about 24N of axial force when assembled. This axial force biases rotor 20 away from the first portion 14, and into engagement with cover 16. Also, when assembled the rotational deflection or deformation of spring 25 causes the spring 25 to be preloaded such that it generates a torsional force of about 250N-mm. Thus, when assembled spring 25 simultaneously generates a substantial axial biasing force and a substantial torsional biasing force.

Due to the axial compression (deflection), spring 25 generates about 24 N of axial force when assembled. This axial force biases rotor 20 away from housing 14, and into engagement with cover 16. Also, when assembled the rotational deflection or deformation of spring 25 causes the spring 25 to be preloaded such that it generates a torsional force of about 250 N-mm. Thus, when assembled spring 25 simultaneously generates a substantial axial biasing force and a substantial torsional biasing force.

The axial force/bias acting on rotor 20 ensures that the rotor does not rattle, and substantially eliminates noises from vibrations or the like. Furthermore, spring 25 has a longer length than conventional torsion springs utilized in prior mechanisms. The longer length allows spring 25 to have a lower torsional spring constant, thereby reducing the spring biasing force acting on the handle 12 (FIG. 1) for a given spring displacement. The total force required by a user in moving (rotating) handle 12 includes force required to overcome the torsion of spring 25 and the force required to actuate adjustment mechanism 4. Thus, reducing the torsional force generated by spring 25 reduces the total force a user must apply to handle 12 to actuate adjustment mechanism 4.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of assembling a release mechanism, the method comprising:
providing a housing defining a pivot element;
providing a rotor adapted to be at least partially disposed within the housing and to pivotably engage the pivot element for rotation about an axis, the rotor including a first bearing surface and a cavity, and wherein the rotor is configured to connect to a cable whereby rotation of the rotor shifts the cable;
providing a helical coil spring having first and second ends;
engaging the first end of the coil spring with the housing;
positioning the second end of the coil spring in the cavity of the rotor;
engaging a second end of the coil spring with the rotor;
rotating the rotor relative to the housing to deform the coil spring such that the helical coil spring rotationally biases the rotor for rotation in a first direction about the axis;
shifting the rotor relative to the housing to compress the coil spring such that the coil spring biases the rotor axially away from the housing along the axis and simultaneously rotationally biases the rotor for rotation in a first direction about the axis;
engaging the rotor with the housing;
connecting a component having a second bearing surface to the housing; and
causing the first bearing surface of the rotor to movably engage the second bearing surface of the component to prevent axial shifting of the rotor away from the housing beyond a predefined position relative to the housing.

2. The method of claim 1, wherein:
the housing includes a stop surface;
and including:
causing the rotor to engage the stop surface to thereby limit angular rotation of the rotor relative to the housing.

3. The method of claim 1, wherein:
the pivot element comprises a boss formed on the housing;
engaging the rotor with the housing includes causing the rotor to pivotably engage the boss for rotation about the axis.

4. The method of claim 1, wherein:
the rotor includes an end portion having an outer surface;
the housing includes a sidewall and an annular wall protruding from an inner side surface of the sidewall, the annular wall having an inner surface; and including:
causing the outer surface of the rotor to slidably engage the inner surface of the annular wall of the housing.

5. The method of claim 1, wherein:
the component consists of a cover;
the second bearing surface comprises an annular surface of the cover; and including:
connecting a second bearing surface to the housing includes connecting the cover to the housing.

6. A method of assembling a release mechanism, the method comprising:
providing a housing defining a pivot element;
providing a rotor adapted to be at least partially disposed within the housing and to pivotably engage the pivot element for rotation about an axis, wherein the rotor is configured to connect to a cable whereby rotation of the rotor shifts the cable, the rotor including a first bearing surface;
providing a helical coil spring having first and second ends;
engaging the first end of the coil spring with the housing;
engaging a second end of the coil spring with the rotor;
rotating the rotor relative to the housing to deform the coil spring such that the helical coil spring rotationally biases the rotor for rotation in a first direction about the axis;
shifting the rotor relative to the housing to compress the coil spring such that the coil spring biases the rotor axially away from the housing along the axis;
engaging the rotor with the housing;
connecting a second bearing surface to the housing; and
causing the first bearing surface of the rotor to movably engage the second bearing surface to prevent axial shifting of the rotor away from the housing beyond a predefined position relative to the housing;
wherein the second bearing surface comprises a surface of a cover; and including:
connecting a second bearing surface to the housing includes connecting the cover to the housing.

7. The method of claim 6, wherein:
the cover includes an opening therethrough;
the rotor includes an extension; and including:
positioning the extension in the opening.

8. The method of claim 7, wherein:
the rotor includes an arm extending transverse to the extension, wherein the arm comprises a portion of the rotor that is configured to connect to a cable whereby rotation of the rotor shifts the cable; and including:
connecting a cable to the arm.

9. The method of claim 8, including:
causing the extension of the rotor to protrude outside of the cover; and including:
connecting a handle to the extension of the rotor.

10. The method of claim 9, wherein:
the extension includes a plurality of splines; and including:
causing the handle to engage the splines.

11. The method of claim 9, wherein:
the rotor includes an inner end portion having an annular wall forming the cavity and defining an opening to the cavity, cavity including an inner base surface with a plurality of inner openings; and including:
causing the second end of the coil spring to be received in a selected one of the inner openings.

12. A method of assembling a release mechanism, the method comprising:
providing a housing defining a pivot element comprising a boss and an annular wall extending around the boss to define a ring-shaped annular space therebetween;
providing a rotor having an end portion configured to be pivotably received within the ring-shaped annular space for rotation about an axis, and wherein the rotor is configured to connect to a cable whereby rotation of the rotor shifts the cable;
providing a helical coil spring having first and second ends;
engaging the first end of the coil spring with the housing;
engaging a second end of the coil spring with the rotor;
rotating the rotor relative to the housing to deform the coil spring such that the helical coil spring rotationally biases the rotor for rotation in a first direction about the axis;
shifting the rotor relative to the housing to compress the coil spring such that the coil spring biases the rotor axially away from the housing along the axis;
engaging the rotor with the housing by shifting the rotor towards the housing and causing the end portion of the rotor to be received in the ring-shaped annular space;
causing the first bearing surface of the rotor to movably engage the second bearing surface to prevent axial shifting of the rotor away from the housing beyond a predefined position relative to the housing.

13. The method of claim 12, wherein:
the housing includes a stop surface;
and including:
causing the rotor to engage the stop surface to thereby limit angular rotation of the rotor relative to the housing.

14. The method of claim 12, wherein:
the end portion of the rotor has oppositely-facing cylindrical inner and outer surfaces;
the annular wall of the housing protrudes from an inner side surface of the sidewall, the annular wall having an inner surface comprising a plurality of raised pads, each having cylindrical end surface portions; and including:
causing the cylindrical outer surface of the rotor to slidably engage the cylindrical end surface portions of the annular wall of the housing.

15. The method of claim 12, wherein:
the end portion of the rotor comprises a first end portion and a second end portion opposite the first end portion wherein the second end portion comprises a cylindrical extension having a plurality of outwardly-protruding splines; and including:
securing the cover to the housing with the cylindrical extension extending through the opening of the cover; and
attaching a handle to the rotor outside the cover by engaging the handle with the splines of the rotor.

* * * * *

UNITED STATES PATENT AND TRADEMARK OFFICE
CERTIFICATE OF CORRECTION

Page 1 of 1

PATENT NO. : 10,675,997 B2
APPLICATION NO. : 15/226663
DATED : June 9, 2020
INVENTOR(S) : Tomandl It is certified that error appears in the above-identified patent and that said Letters Patent is hereby corrected as shown below:

In the Specification

Column 7, Lines 15-23:
Delete the paragraph: "Due to the axial compression (deflection), spring 25 generates about 24N of axial force when assembled. This axial force biases rotor 20 away from housing 14, and into engagement with cover 16. Also, when assembled the rotational deflection or deformation of spring 25 causes the spring 25 to be preloaded such that it generates a torsional force of about 250N-mm. Thus, when assembled spring 25 simultaneously generates a substantial axial biasing force and a substantial torsional biasing force."

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*